Figure 1:
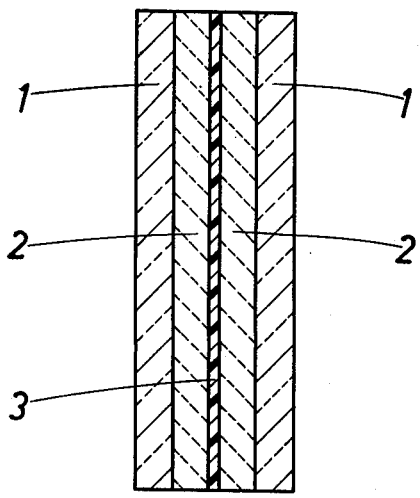

United States Patent [19]

Jacquemin et al.

[11] 4,071,649
[45] Jan. 31, 1978

[54] FIREPROOF GLASSWORK

[75] Inventors: Francis Jacquemin, Monceau-sur-Sambre; Robert Terneau, Montignies-sur-Sambre; Jean-Pierre Voiturier, Gerpinnes, all of Belgium

[73] Assignee: Glaverbel-Mecaniver, Watermael-Boitsfort, Belgium

[21] Appl. No.: 688,699

[22] Filed: May 21, 1976

Related U.S. Application Data

[63] Continuation of Ser. No. 455,719, March 28, 1974, abandoned.

[30] Foreign Application Priority Data

| Mar. 30, 1973 | United Kingdom | 15466/73 |
| Sept. 17, 1973 | Germany | 43538/73 |
| Sept. 17, 1973 | Germany | 43536/73 |

[51] Int. Cl.² .................................................. B32B 17/06
[52] U.S. Cl. .................................... 428/215; 428/332; 428/426; 428/427; 428/428; 428/432; 428/424; 428/425; 428/913; 428/920
[58] Field of Search ................ 428/34, 142, 332, 426, 428/427, 428, 432, 913, 920, 215, 425, 424

[56] References Cited

U.S. PATENT DOCUMENTS

| 3,006,783 | 10/1961 | Haaijman et al. | 161/192 |
| 3,341,399 | 9/1967 | Hazdra et al. | 161/199 |
| 3,457,138 | 7/1969 | Miller | 161/196 |
| 3,508,810 | 4/1970 | Baltzer | 161/192 |
| 3,537,944 | 11/1970 | Grubb et al. | 161/225 |
| 3,539,442 | 11/1970 | Buckley et al. | 161/199 |
| 3,582,455 | 6/1971 | DeLap et al. | 161/165 |
| 3,630,809 | 12/1971 | Edwards | 161/199 |
| 3,640,837 | 2/1972 | Gaeth et al. | 428/332 |
| 3,793,105 | 2/1974 | Birchall et al. | 161/192 |
| 3,838,091 | 9/1974 | Kanno et al. | 161/1 |
| 3,974,316 | 8/1976 | Jacquemin et al. | 428/215 |
| 3,997,700 | 12/1976 | Jacquemin et al. | 428/332 |

Primary Examiner—William R. Dixon, Jr.
Attorney, Agent, or Firm—Cushman, Darby & Cushman

[57] ABSTRACT

A fire screening glazing panel and a method of producing same. A panel is formed of at least two structural plies and at least one of which is a vitreous sheet, layers of heat convertible thermally insulating barrier forming material are placed on a face of each ply, and a plastic membrane is sandwiched between the layered plies, the layers being adjacent the plastic membrane. When formed in this way, the plastic membrane makes the transfer of heat from one barrier-forming material layer to the other more uniform and prolongs the time taken for the vitreous sheet to reach a given temperature, while the panel as a whole is in itself sufficient to prevent or delay propagation of fire across an opening closed by the panel. Protective strata may be applied to each vitreous ply on its face that will be in contact with the barrier forming material layer to inhibit interaction between the ply and the layer and preserve the transparency (if the ply is transparent) of the ply over an extended period of time.

22 Claims, 5 Drawing Figures

FIREPROOF GLASSWORK

This is a continuation, Ser. No. 455,719 filed Mar. 28, 1974 and now abandoned.

This invention relates to a fire-screening glazing panel comprising a fire screening means which becomes operative when sufficiently heated.

In the construction of buildings, glazing panels sometimes are used in exterior or interior walls or partitions. An obvious example is the use of light-transmitting glazing panels used as windows.

Structural components occasionally must satisfy stringent standards of fire resistance. Fire resistance is sometimes quantified against a standard test in which the structural component is exposed to a specified temperature cycle over a certain period of time. The fire resistance potential of the component depends on the length of time for which the component can retain the strength required for it to fulfill its function. To comply with some fire resistance standards the component must have a minimum strength retention time, must be completely flame-proof, and must provide enough thermal insulating power to ensure that the component will prevent propagation of fire by heat radiation from the component and will not become so hot as to result in serious risk of burning a person who may touch the panel while it is exposed to the fire.

The standard of fire resistance of a given component may be quantified as a function of the time for which the component satisfies one or more of the specified criteria during a test in which the component is exposed to the interior of an enclosure in which the temperature is raised according to a predetermined schedule. For example standards of fire resistance designated 1, 2 and 3 may be set corresponding to resistance times of 15, 30 and 60 minutes respectively in a test in which the temperature of the test enclosure is 720°, 820° and 925° C respectively for each time period.

Ordinary panels comprising one or more sheets of vitreous material are not highly thermally insulating or fire resistant. When exposed to fire, they become very hot so that they cannot be touched without causing personal injury. Moreover heat radiation from the heated panel itself constitutes a further fire hazard.

Various proposals have been made for dealing with this problem. One proposal is to install in a building having door and window openings sprinkler heads for supplying a fire-extinguishing agent, e.g. water. The sprinkler heads are placed above each door and window opening of the building and communicate with a common reservoir containing the fire extinguishing agent. When fire occurs, the sprinkler heads supply fire extinguishing agent along the doors and windows. Such installations have certain disadvantages. Among those disadvantages is the fact that the installations are complicated and cannot be easily installed.

It is an object of the invention to provide a fire-screening glazing panel which can be easily and conveniently handled and installed. It is a further object to provide such a panel which has improved thermal insulating and fire-resisting properties. In particular the invention seeks to provide a panel which is resistant to mechanical breakage when subjected to rapid heating by a heat source disposed on one side of the panel.

The present invention as broadly defined resides in a fire-screening glazing panel comprising a fire-screening means which becomes operative when sufficiently heated, characterized in that the panel comprises a first structural ply formed by a vitreous sheet and at least one other structural ply, and characterized in that between the said first structural ply and the other or another structural ply there is sandwiched at least one plastic membrane and, on opposite sides of said membrane(s), layers, at least one of which is composed of at least in part of material which when sufficiently heated is converted to form a thermally insulating barrier or barriers which is or are opaque or of greatly reduced infra-red radiation transmitting power as compared with such layer before such conversion.

The expression "Vitreous material" as used herein comprises glass and vitrocrystalline material. Vitrocrystalline material is formed by subjecting a glass to a thermal treatment so as to induce the formation of one or more crystalline phases therein.

The invention affords a number of advantages which are considered to be important.

A first advantage is the fact that the fire-screening glazing panel is very easy to install and is in itself sufficient to prevent or to delay the propagation of fire across an opening closed by the panel.

A second advantage is the fact that if the panel is installed as part of a wall of an enclosure in which fire breaks out so that the plastic membrane is disposed between the first structural ply and the interior of said enclosure, the plastic membrane obviates or reduces tendency for local over-heating of the first ply to take place with consequent risk of breakage thereof. The area which is immediately behind the plastic membrane (the area occupied by that one of the sandwiched layers which is nearer the fire) may become non-uniformly heated due, for example, to the behavior of the material of that layer on being heated and converted to form a thermally insulating barrier. However the plastic membrane will serve to ensure a more uniform distribution of the heat transmitted to the sandwiched layer which is in front of the membrane and to the first structural ply.

A third advantage is that under the circumstances referred to, the time taken for the vitreous sheet constituting the first ply to reach a given temperature is prolonged due to the presence of the membrane. The vitreous sheet can therefore provide the exterior face of the panel which is exposed to touch, with less risk of causing burns than would be involved in using a panel of known construction and comparable weight.

As has been stated, at least one layer of barrier forming substance is convertible by heat to form a barrier which is of greatly reduced infra-red radiation transmitting power, or which is opaque. This feature allows the formation of very effective fire screens since the intensity of any infra-red radiation from a fire on one side of the panel which is transmitted through the panel may be reduced to a level at which it cannot, of itself, start a secondary fire on the other side of the panel.

It will be appreciated that if the panel were installed in reverse orientation to that above described, i.e., with the said first ply between the fire and the plastic membrane, a corresponding advantage will be achieved, namely that the plastic membrane will slow down the heating of the other face of the panel. In such a case that front face may be formed for example by another vitreous sheet.

The invention is equally applicable to opaque panels and light-transmitting panels.

The use of opaque glazing panels, i.e. panels comprising one or more sheets of glass or vitrocrystalline material, is becoming increasingly important in architecture and such panels are often used to form, for example, the lower part of a partition whose upper part is transparent, especially when it is desired that the surface texture or some other property of the panels forming the upper and lower parts of the partition be similar. Preferably however, the panel is a light transmitting panel, so that it may be used, for example, as an observation window until the advent of fire.

Advantageously, the barrier forming material is convertible by heat to form a solid porous or cellular body, since such bodies generally have low thermal conductivity.

Preferably, said barrier forming material comprises an hydrated metal salt.

Examples of metal salts which can be used in hydrated form are as follows:

| Aluminates, | e.g. | sodium or potassium aluminate |
|---|---|---|
| Plumbates, | e.g. | sodium or potassium plumbate |
| Stannates, | e.g. | sodium or potassium stannate |
| Alums, | e.g. | sodium aluminum sulphate or potassium aluminum sulphate |
| Borates | e.g. | sodium borate |
| Phosphates, | e.g. | sodium orthophosphates, potassium orthophosphates and aluminum phosphate |

Hydrated alkali metal silicates, e.g. sodium silicate, are also suitable for use in a said layer incorporating heat-convertible material.

Such substances have very good properties for the present purposes. They are in many cases capable of forming transparent layers which adhere well to glass or vitrocrystalline material. On being sufficiently heated, the combined water boils and the layers foam, so that the hydrated metal salt is converted into an opaque solid porous or cellular form in which it is highly thermally insulating and remains adherent to the glass or vitrocrystalline material.

This feature is particularly important, since even if all the structural plies of the panel are cracked or broken by thermal shock, the panel may retain its effectiveness as a barrier against heat and fumes since the fragments of the plies may remin in position bonded together by the converted metal salt.

If a panel according to the invention and incorporating such hydrated metal salt sandwiched layers is exposed to fire, the water in the salt layer which is nearer the fire is first boiled off. As this layer is heated the other hydrated metal salt layer is kept at a somewhat lower temperature due to the presence of the plastic membrane. During boiling off of the combined water of the first sandwiched layer, its temperature remains substantially constant, and thermal conversion of the fire screening material on the said other sandwiched layer is delayed. As the combined water becomes completely removed from the sandwiched layer nearer the fire this layer becomes effective as a thermal barrier.

In some embodiments, a layer of hydrated metal salt is used which is merely translucent, but preferably the hydrated metal salt forms a transparent solid layer at ambient temperature. Sodium silicate, sodium aluminum sulphate and aluminum phosphate can form transparent layers.

It has been found that vitreous sheets may suffer deterioration to varying degrees by prolonged contact with various barrier-forming materials e.g. hydrated metal salts. This is particularly important in the case of transparent or colored sheets, since they may suffer a loss of transparency or undergo a change in color.

Preferably, therefore, a protective stratum is provided between said first structural ply and the adjacent heat convertible layer said protective stratum being formed so as to inhibit interaction between the barrier forming material and the first structural ply.

If the other structural ply is also a vitreous sheet, a protective stratum is preferably likewise provided between that other vitreous sheet and the adjacent layer of barrier-forming material.

This feature is equally applicable in cases where the panel is a true laminate, i.e. a multi-ply panel whose plies are bonded together face to face, and where it is a multi-ply panel whose plies are held clamped together by extraneous means, such as a frame.

In some preferred embodiments, the protective stratum comprises a sheet of substantially water-impervious plastic material. Polyvinyl butyral is an especially suitable material for forming a plastic protective stratum, which may for example be 0.76 mm thick, though any other film-forming plastics material having the requisite properties may be used.

In other preferred embodiments of the invention there is at least one protective stratum which comprises a coating applied to the vitreous sheet face to be protected. Such a coating preferably comprises an anhydrous metal compound deposited onto such sheet face, since such coatings can form very effective protective strata.

Clearly, one criterion affecting choice of a suitable coating material will be the composition of the thermally insulating barrier forming layer. By way of example when the barrier forming material is of sodium silicate, borax or an alum of potassium or sodium, then the coating material preferably comprises zirconium oxide or anhydrous aluminum phosphate. When the thermally insulating barrier forming layer is of hydrated aluminum phosphate, then titanium oxide, zirconium oxide, tin oxide and anhydrous aluminum phosphate are eminently suitable protective coating materials. It is, perhaps, surprising to note that a protective stratum of anhydrous aluminum phosphate when deposited onto a vitreous sheet will serve substantially to prevent interaction between that vitreous sheet and an adjacent layer of hydrated aluminum phosphate. This invention does not exclude the use of other coating materials.

Preferably the protective stratum when constituted by a coating as aforesaid is between 100 and 1,000 Angstrom unit thick, so as to provide a nonporous coating without giving rise to unsightly interference effects.

Preferably, at least one said layer of barrier forming material is between 0.1 mm and 8 mm in thickness. Layers having this range of thickness can be converted to become very effective fire-screening barriers. It is clear that the effectiveness of a fire-screening barrier formed from a layer of given material will depend on its thickness, however, the transparency of such a layer will become less with increased thickness. Preferably at least one layer of heat-convertible material has a thickness of between 0.1 and 0.5 mm.

The plastic membrane or membranes in a panel according to the invention can be formed of any film-forming plastic material having the requisite properties. Preferably the panel incorporates at least one plastic membrane composed of polyvinylbutyral, since this material is especially suitable.

Polyurethane is also a very suitable material for forming at least one of said membranes, and indeed, polyurethane is also suitable for forming a plastic protective stratum.

Preferably the first structural ply and/or at least one other vitreous sheet (if present) of the panel is tempered. A tempered vitreous sheet is better able to withstand thermal shocks. Chemically tempered sheets are particularly preferred.

A panel according to the invention preferably comprises two structural plies, each constituted by a vitreous sheet and each providing an external face of the panel. Such a panel structure has a merit of simplicity. It is to be understood however that it is within the scope of the invention for the panel to incorporate more than two structural plies. The invention also includes panels where a plastic membrane, together with layers of thermal barrier-forming material on opposite sides of the membrane, is present in each of the two or more interply spaces.

According to preferred embodiments of the invention the panel is in the form of a laminate, i.e., a multi-ply panel structure in which the first vitreous sheet, at least one other structural ply, a plastic membrane between the plies and the heat convertible layers on opposite sides of the membrane are bonded together in face to face relation.

The invention however also includes multiply panels in which the first ply, another structural ply, a plastic membrane intervening between the plies, and heat convertible layers on opposite sides of the membrane are held together by extraneous means, e.g., by means of a frame.

The invention also includes an article which comprises a multi-ply panel according to the invention as hereinbefore defined together with a second panel (comprising a single sheet or a plurality of sheets) held in spaced relationship to said multi-ply panel. Thus the invention can be embodied in a hollow glazing unit.

As already stated, embodiments of the invention in which the panel is in the form of a laminate are preferred. The invention also includes a method of forming such a laminate, which method comprises the steps of applying onto one side of a first viteous structural ply a layer of a material which when sufficiently heated is converted to form a thermally insulating barrier, applying such a layer to another structural ply, assembling the coated plies on opposite sides of a layer of plastic membrane forming material with said applied layers adjacent thereto, and subjecting the assembly to heat and pressure to bond the coated plies and the plastic membrane together to form a laminate. This is a very simple and effective way of forming a laminate-type panel according to the teachings of the present invention. The method obviates any need to apply adhesive between the coatings on the structural plies and the plastic membrane.

Preferably, at least one of the heat convertible layers is formed of an hydrated metal salt, said hydrated metal salt preferably being selected from the following group; aluminates, plumbates, stannates, alums, borates, phosphates and alkali metal silicates. The advantages conferred by these method steps correspond to the advantageous features of the panel formed according to the teachings of the present invention.

Advantageously, the hydrated metal salt layers are applied as aqueous solutions which are dried before assembly of the panel. For example, in order to obtain a layer of hydrated aluminum phosphate, an aqueous solution containing 3.5 moles/liter of the salt is applied to a sheet, and subsequently dried by using a fan. This solution may be obtained by mixing solutions of phosphoric acid and aluminum chloride in stoichiometric proportions. This is a very simple way of obtaining the required layers of barrier forming material.

Preferably a protective stratum is formed on a face of the vitreous first structural ply before a heat convertible layer is applied thereto, the protective stratum being composed of a material selected so as to inhibit interaction between the barrier forming material and the first structural ply. Preferably a protective stratum is formed on each vitreous sheet face of the panel onto which a layer of barrier forming material is subsequently applied. Preferably at least one such protective stratum is formed as a sheet of substantially water impervious plastic material, and advantageously the plastic protective stratum is formed of polyvinyl butyral. In preferred embodiments of the method according to the teachings of the present invention at least one protective stratum is applied to a vitreous sheet face as a coating. Preferably, such a protective stratum is formed by depositing a coating of an anhydrous metal compound onto a vitreous sheet face. The advantages of these preferred method steps according to the teachings of the present invention are apparent from the corresponding advantages of the panel formed according to the teachings of the present invention.

Such a deposition of an anhydrous metal compound coating to serve as a protective stratum is preferably performed by pyrolysis or hydrolysis, since these are very convenient ways of forming a uniform coating which is highly resistant to the deleterious effects of a barrier forming material.

Preferably, the barrier forming material is selected from the group consisting of alums, borates, and alkali metal silicates, and the anhydrous metal compound for forming a protective stratum is selected from the group consisting of zirconium oxide and anhydrous aluminum phosphate, however, the barrier forming material may comprise hydrated aluminum phosphate, the anhydrous metal compound for forming a protective stratum then being selected from the group consisting of titanium oxide, zirconium oxide, tin oxide and anhydrous aluminum phosphate.

Advantageously, a protective coating is formed to a thickness of between 100 and 1000 Angstrom units. Preferably, at least one heat-convertible layer is formed to a thickness of between 0.1 mm and 8 mm, and optimally, such a heat convertible layer is formed to a thickness of between 0.1 mm and 0.5 mm. In preferred embodiments of the method according to the teachings of the present invention, said coated plies are assembled and bonded together on opposite sides of a said membrane of plastic material comprising polyvinyl butyral.

In such a method according to the teachings of the present invention it is preferable for the layers applied to the structural plies to be layers of one or more hydrated alkali metal silicates, since such barrier forming materials are more readily able to withstand the bonding temperature required than certain other hydrated metal salts herein set forth.

In some preferred embodiments of the method according to the teachings of the present invention the coated structural plies are applied on opposite sides of a layer of plastic membrane forming material comprising an organic monomer with the applied heat convertible layers next to said monomer containing stratum, and the assembly is subjected to heat and pressure to polymerize the monomer in situ and bond the coated structural plies together on either side of the plastic membrane thus formed. Embodiments having this feature have the advantage that the polymerization temperature may be kept below 80° C by suitable choice of organic monomer, and this obviates risk of premature conversion of the barrier forming layer during the bonding process.

Urethane is a very suitable organic monomer for incorporating in such layer.

When a plastic membrane is formed in this manner it is very convenient to form the plastic protective stratum in a like manner.

The invention will now be described by way of example with reference to the accompanying diagrammatic drawings in which FIGS. 1 to 5 are cross-sectional views of various preferred embodiments of fire screening glazing panels according to the teachings of the present invention.

EXAMPLE 1

A fire screening panel was made as shown in FIG. 1. This panel comprises two sheets 1,1 of glass each of which carriers a layer 2 of hydrated sodium silicate, and these layers are bonded together on opposite sides of a membrane 3 of polyvinyl butyral.

The glass sheets 1 are of soda-lime glass 3mm thick, the layers 2 of hydrated sodium silicate are each 2.5mm thick, and the plastic membrane 3 has a thickness of 0.76mm.

In order to form the layers 2, hydrated sodium silicate was applied in an aqueous solution having the following properties:

| Proportion by weight | $\frac{SiO_2}{Na_2O} = 3.4$ |
|---|---|
| Viscosity | 200 centipoises |
| Specific gravity | 37° to 40° Baume |

This solution was applied to a face of each glass sheet while the sheets were substantially horizontal and at a temperature of 20° C. The solution thus applied was allowed to spread out over the glass sheets.

Currents of warm air were then directed onto the solution in order to dry it. This drying has the effect of driving off excess, unbound water of solution to leave a layer of hydrated sodium silicate on each glass sheet. After formation of these layers of hydrated sodium silicate on the sheets, the sheets were placed on either side of a sheet 3 of polyvinyl butyral 0.76 mm thick as shown in FIG. 1.

In order to bond the panel together to form a laminate, the assembled panel was placed in a chamber in which reduced pressures could be obtained. Reduction in pressure has the effect of removing any air which is trapped between the various plies of the panel. After reduction of pressure the temperature of the panel is raised, also under partial vacuum to 80° C to reach a pre-bonding stage of the panel. After the "pre-bonding" operation the bonding operation is preformed in the classical manner at a pressure of 15 kg./cm² and at a temperature of 130° C. The panel thus formed may be placed in a frame very easily and is very advantageous in case of a fire. Indeed, it has been found that such a panel keeps its mechanical stability and its flame-proof properties for 45 minutes. It should be noted that on the advent of fire the layers 2 of hydrated sodium silicate are converted to an anhydrous sodium silicate having an opaque porous form.

When a fire screening panel according to the present example is subjected to the action of fire one one of its sheet faces, the layer of hydrated sodium silicate applied to the sheet closest to the fire is converted to an opaque porous fire screening barrier of anhydrous sodium silicate. This anhydrous barrier is somewhat thicker than the hydrated layer from which it was formed, and is a very effective barrier against infrared radiation. During the course of the conversion, the bound water is driven off and thus contributes to a limitation of the temperature increase in that layer. During this phase the plastic membrane helps to make the temperature uniform across the whole area of the panel, and any local "hot spots" in the firstly converted layer are reflected in larger hot zones in the second layer. When this first layer is completely dehydrated the other layer of hydrated sodium silicate is in turn converted to form an opaque porous barrier of anhydrous sodium silicate.

These phenomena enable the face of the fire screening panel which is not directly subjected to the action of fire to be maintained at an acceptable temperature for an increased period of time. In fact it has been found that when the fire screening panel is arranged in a furnace wall the following results are achieved:

| Time | Temperature within furnace | Temperature on outer face of fire screening panel |
|---|---|---|
| 0 | 20° C | 20° C |
| 15 minutes | 725° C | 100° C |
| 30 minutes | 825° C | 100° C |
| | 900° C | 200° C |

The panel has a high degree of mechanical stability during and after conversion of its barrier forming layers.

In a variation of the embodiment shown in FIG. 1, use was made of glass sheets 1,1 which had been subjected to a chemical tempering treatment involving a diffusion of ions into the glass from a contacting medium. This chemical tempering is an exchange of sodium ions from surface layers of the treated sheets by Potassium ions from the contacting mechanism which comprises a bath of molten Potassium nitrate maintained at a temperature of 470° C. The result obtained from the point of view of thermal insulation, mechanical stability and effectiveness as a flame- and fume-proof barrier were analogous to those obtained with the fire screening panel described above. However, this modification has a greater resistance to thermal shock during the first few minutes of a fire than does the panel described above.

In a second modification for use in situations where there is only a very slight fire risk on one side of the partition, the sheet of glass 1 to be directed towards that side is replaced by a sheet of plastic material. Again, the results obtained from the point of view of resistance of fire were similar to those given above.

In a third modification, a fire screening panel was constructed exactly as described at the beginning of this example, except that the layers 2 of hydrated sodium silicate were found to a thickness of 0.2 mm instead of 2.5 mm. From the point of view of fire resistance, this modification is slightly less effective than the panels described above. However, this panel does have the advantage of increased transparency.

In yet another modification, a fire screening panel was constructed as described above, except that the polyvinyl butyral membrane was replaced by a membrane of polyvinyl chloride. Changing the membrane in this way had no effect on the fire resistance of the panel.

EXAMPLE 2

Figure 2:
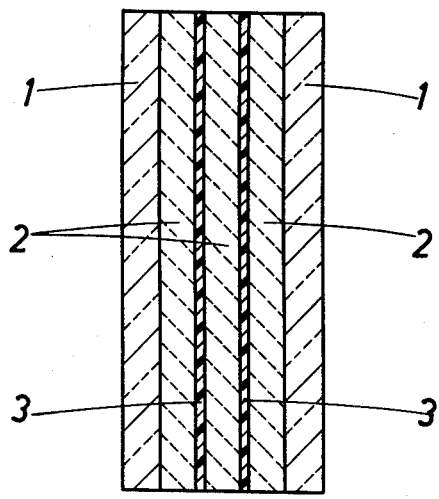

The embodiment shown in FIG. 2 is similar to that shown in and described with reference to FIG. 1, except that it incorporates an additional layer of barrier forming material 2 and an additional plastic membrane 3. The central layer of barrier forming material 2 was formed as a layer on one of the membranes 3, and the panel was assembled by a method similar to that described with reference to FIG. 1.

In this embodiment the glass sheets 1 were of soda-lime glass 3mm thick. The layers 2 of hydrated sodium silicate were each 2.5mm thick and each plastic membrane 3 had a thickness of 0.76 mm.

This embodiment of fire screening glazing panel can also easily be placed in a frame. It will be appreciated that from the point of view of fire resistance, this panel is better than that of Example 1 because of the additional thickness of barrier forming material.

EXAMPLE 3

Figures 3, 4:
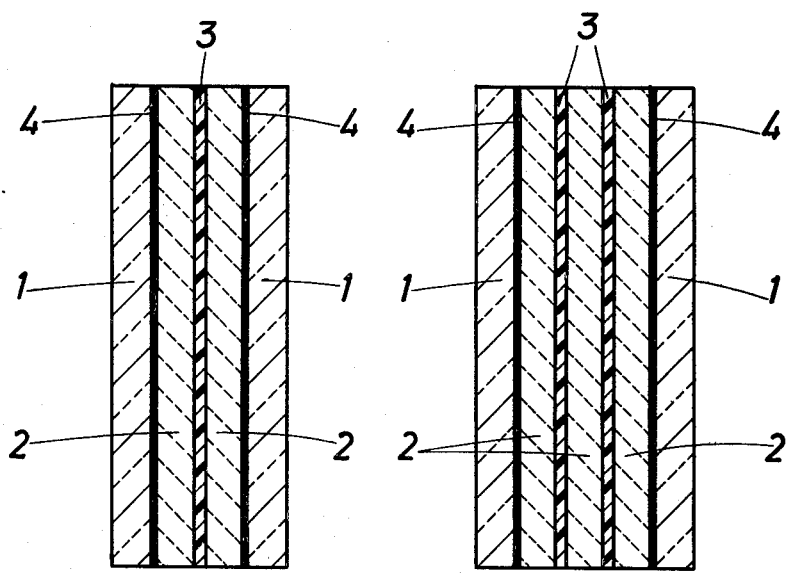

To form the panel shown in FIG. 3, two sheets of glass 1,1 were each coated on one side with a protective stratum 4 of zirconium oxide 500 Angstrom units thick. The zirconium oxide coating was formed in known manner by pyrolysis of a solution in alcohol which had been sprayed through an atomizing nozzle onto a sheet of glass heated to 550° C. The solution used comprised denatured ethyl alcohol containing 150 gr/liter of zirconium tetrachloride to which was added 10% by volume of acetylacetone. The solution was used unheated.

The coated side of each sheet 1 was then covered with a heat convertible layer 2 of hydrated sodium silicate. In an actual example, protectively coated glass sheets 1, each 4 mm thick, were covered with heat convertible layers 2.5 mm thick by applying a solution of hydrated sodium silicate to the coated sides of the sheets and then ventilating the sodium silicate with warm air by means of a fan to drive off unbound water.

The sodium silicate solution applied had the following properties:

| Proportion by weight | $\dfrac{SiO_2}{Na_2O} = 3.4$ |
|---|---|
| Viscosity | 200 centipoises |
| Specific gravity | 37° to 40° Baume |

The sodium silicate solution was applied and then dried for a period of 12 hours at 30° C in an atmosphere having a relative humidity of 35%. The coated sheets were then assembled on opposite sides of a layer of a urethane membrane 3 and the plies bonded together to form a laminate. The bonding temperature was kept below 100° C in order to obviate risk of converting hydrated sodium silicate to anhydrous sodium silicate.

The degree of fire resistance given by this panel was similar to the results shown in Example 1.

In addition, the panel described in the present Example has the further advantage of maintaining its optical properties until the advent of fire, even for a prolonged period. In particular, it has been found that a panel incorporating such protective coatings does not lose its transparency after prolonged periods. It has been observed that a reduction in transparency will take place in the absence of protective strata because of the interaction between hydrated sodium silicate and the glass sheets.

As a modification of the embodiment shown in FIG. 3, use was made of glass sheets 1 which had previously been subjected to a chemical tempering treatment involving the exchange of sodium ions from the glass with potassium ions from a contacting medium. The use of tempered glass sheets gave the panel an increased resistance to breakage due to thermal shock.

In another modification, the sheet of glass 1,1 were replaced by sheets of vitro-crystalline material, and this also gave good results.

EXAMPLE 4

The embodiment shown in FIG. 4 is similar to that described in Example 3, except that it incorporates an additional layer of barrier forming material 2, and an additional plastics membrane 3. The central layer of barrier forming material 2 was formed as a layer on one of the plastic membranes 3, and the panel was assembled by a method similar to that described in Example 3.

The thicknesses of the various plies of the panel were the same as those in Example 3.

It will be appreciated that because of the additional heat convertible layer 2, this panel gave a greater degree of fire-resistance than the panel described in Example 3.

In another embodiment, the zirconium oxide protective coatings 4 of FIG. 4 were replaced by coatings of indium oxide each 400 Angstrom units thick. These coatings were formed in a known manner, by spraying a solution of indium chloride through an automizing nozzle onto hot sheets of glass where the indium chloride was converted to indium oxide by pyrolysis. This modification also had very good fire resisting properties.

EXAMPLE 5

In FIG. 1, two sheets of glass 1,1 were each coated on one side with a layer 2 of hydrated sodium aluminum sulphate. In an actual example, glass sheets each 4 mm thick were each coated with a layer 2.5 mm thick by applying wet hydrated sodium aluminum sulphate to the sheets and then ventilating the coatings with warm air by means of a fan to drive off unbound water. The coated glass sheets were then assembled on opposite sides of a stratum of urethane and the assembly was subjected to pressure and heat to polymerize the urethane to form a polyurethane membrane 3 and bond the coated glass sheets together to form a laminate. The bonding temperature was kept below 80° C in order not to convert the hydrated sodium aluminum sulphate to an anhydrous material. When the fire resistance of this panel was tested, the results achieved were similar to those set out in Example 1.

In a variation of this embodiment, use was made of glass sheets 1 which has been subjected to a chemical tempering treatment involving the diffusion of potassium ions into the glass from a contacting medium in exchange for sodium ions from the glass.

In another embodiment for use in situations where there is only a very slight fire risk on one side of a partition, the sheet of glass 1 to be directed towards that side was replaced by a sheet of plastic material.

In a third embodiment, the two glass sheets 1,1 were replaced by sheets of opaque vitrocrystalline material. Similar results were achieved by these variant panels.

EXAMPLE 6

A panel was constructed as shown in FIG. 2 in a manner similar to that described in Example 5, except that it incorporated an additional layer 2 of hydrated sodium aluminum sulphate and an additional plastic membrane 3. The central layer of barrier forming material 2 was formed as a layer on one of the urethane strata after that stratum had been formed on a layer 2 of barrier forming material deposited on a structural ply 1, but before polymerization thereof, and the panel was assembled by a method similar to that described in Example 5. The two glass sheets were each 4 mm thick, and the three heat convertible layers each had a thickness of 2.5 mm. This panel had a greater fire resistance than the panel of Example 5.

EXAMPLE FIG. 7

A fire-screening panel as schematically shown in FIG. 3 was made comprising two glass sheets 1,1, two heat convertible layers 2 of hydrated sodium aluminate, a membrane 3 of polyvinyl butyral, and two protective strata 4 of acrylic resin.

The sheets 1 were each of soda-lime glass 4 mm in thickness. They were each placed substantially horizontally, and a pre-polymerized liquid was applied to a depth of 100 microns on their upper surfaces. The pre-polymerized liquid was formed by co-polymerization of acrylic acid and methyl acrylate and contained 5% by weight of methacryloxypropyltrimethoxysilane in order to give increased adhesion to the glass. The treated sheets were then heated to 60° C to obtain protective strata of acrylic resin by polymerization.

A layer 1 mm in thickness of hydrated sodium aluminate was then deposited onto the protected face of each sheet of glass. The hydrated sodium aluminate Which had been applied in solution was then dried in a current of warm air. When the layers were dry, they were assembled on either side of a membrane 3 of polyvinyl butyral 0.76 mm thick, and the assembly was bonded together to form a laminate by the method described in Example 1, except that care was taken to ensure that the bonding temperature did not rise about 120° C in order to avoid risk of converting the sodium aluminate to an anhydrous material.

Substantially identical panels have also been made by a modified method. As above, each glass sheet was given a 100 micron coating of the same pre-polymerized liquid, but instead of heating the sheets at this stage, a 1 mm layer of hydrated sodium aluminate was applied to one of the sheets and dried. A plastic membrane 0.76 mm thick was laid over this dried layer, and a second layer of hydrated sodium aluminate was laid on the membrane to a thickness of 1 mm and then dried with warm air. This second layer was then assembled to the coated face of the other glass sheet and the assembly was bonded together by the method of Example 1, the bonding temperature again not being allowed to exceed 120° C. At this temperature and pressure, the prepolymerized liquid polymerizes to form acrylic resin protective strata bonding the heat convertible layers to the glass sheets, and the heat convertible layers are themselves bonded together firmly via the intervening membrane of polyvinyl butyral.

In another embodiment, the acrylic resin protective strata 4 were replaced by protective strata of polyvinyl butyral, each 0.76 mm thick.

In further modifications, the layers of hydrated sodium aluminate were replaced respectively by potassium aluminate, sodium plumbate, potassium plumbate, sodium stannate and potassium stannate, all in hydrated form.

In yet further modifications, each heat convertible layer was composed of a different barrier forming material.

The glazing panels described in this Example have and maintain good optical properties, and have fire resistance characteristics similar to the panels described in Example 3.

EXAMPLE 8

A fire screening panel was made comprising two sheets 1,1 (see FIG. 3) of transparent vitrocrystalline material of known composition, two heat convertible layers 2 of hydrated potassium aluminum sulphate each 0.5 mm in thickness, a membrane 3 of polyvinyl butyral 0.76 mm in thickness, and two protective coatings 4 of anhydrous aluminum phosphate each 500 Angstrom units thick. The vitrocrystalline sheets were each 4 mm thick.

The anhydrous aluminum phosphate protective strata were formed as follows. A solution in alcohol of one mole of anhydrous aluminum chloride and one mole of anhydrous phosphoric acid was placed in a bath and each sheet was dipped therein. The sheets were arranged vertically and withdrawn from the bath at a speed of 75 cm/minute in that position. One side of each sheet was then wiped, and the sheets were placed in a furnace and heated to 400° C. Under these conditions, the alcohol evaporates to leave a coating of anhydrous aluminum phosphate on the unwiped side of each sheet.

A solution of potassium aluminum sulphate is then applied to the sheets 1 on top of the protective strata 4 to form heat convertible layers 2. This solution is made by dissolving the potassium aluminum sulphate in distilled water and then heating the solution to evaporate some of the water and obtain a viscous liquid which can easily be spread on the vitrocrystalline sheets. The heat convertible layers are dried in warm air currents and are assembled face to face via an intervening membrane 3 of polyvinyl butyral 0.76 mm thick, and the assembly is bonded together.

It has been found that the optical properties of this panel are maintained during the course of time since the said protective strata serve substantially to prevent interaction between the vitrocrystalline material and the potassium aluminum sulphate. The fire resistance properties of this panel are similar to those of the panels of Example 7.

EXAMPLE 9

A fire screening glazing panel as shown in FIG. 3 was formed from two sheets 1,1 of transparent vitrocrystalline material each 4 mm in thickness, two heat convertible layers 2 of hydrated sodium borate each 1 mm in thickness, a membrane 3 of polyvinyl butyral 0.76 mm thick and a protective coating 4 on the face of each sheet 1 which carried the heat convertible layer.

The heat convertible layers 4 were of zirconium oxide and were each deposited to a thickness of 350 Angstrom units by the technique given above in example 3. The sodium borate layers 2 were deposited on the zirconium oxide coatings 4 on the sheets 1 using a saturated solution of sodium borate. The layers thus obtained were dried in currents of warm air so as to drive off excess water.

In another embodiment a fire screening glazing panel was made which was similar to that described immediately above except that the sodium borate layers 2 were replaced by layers of hydrated sodium silicate each 2.5 mm thick. The hydrated sodium silicate layers were applied by the technique described in example 1.

It was found that the optical properties of these panels were maintined during the course of time since the zirconium oxide protective strata served substantially to prevent interaction between the vitrocrystalline material and the hydrated sodium borate or hydrated sodium silicate. The fire resistance properties of these panels were good.

EXAMPLE 10

A fire resistant glazing panel, as shown in FIG. 3 was made comprising two sheets 1 of soda-lime glass, two heat convertible layers of hydrated aluminum phosphate each 1.5 mm in thickness, a membrane 3 of polyvinyl butyral 0.76 mm thick and two protective strata 4 of titanium oxide which were each 400 Angstrom units thick. The glass sheets were each 4 mm thick.

The titanium oxide protective strata were deposited by the well known vacuum evaporation technique.

The heat convertible layers of hydrated aluminum phosphate were formed as follows: a 3.5 molar aqueous solution of aluminum phosphate obtained as the reaction product of solutions of hydrated aluminum chloride and phosphoric acid was applied onto the surface of the glass sheets 1 bearing titanium oxide coatings. The hydrated aluminum phosphate layers were then dried in currents of warm air. After drying, the panel was assembled according to the method described in example 1.

The optical properties of this panel were maintained during the course of time and the fire resistance properties were good.

As another variation, a similar fire screening vitreous panel was made in which the titanium oxide coatings were replaced by tin oxide coatings each 500 Angstrom units thick. These coatings were applied in the classical manner using a solution of tin chloride and the well known hydrolysis process. The optical and fire resistance properties of this modification were similar to those of the panel first described in this example.

EXAMPLE 11

A fire screening glazing panel, as shown in FIG. 1 was made comprising two sheets 1,1 of soda-lime glass each 4 mm thick, two heat convertible layers 2 of hydrated sodium phosphate each 5 mm thick, and a membrane 3 of polyvinyl butyral which was 0.76 mm in thickness.

The layers 2 of hydrated sodium phosphate were obtained by applying an aqueous solution of sodium phosphate on to the glass sheets, and the sheets were then heated to 100° C in order to drive off the free water without, of course, converting the hydrated sodium phosphate to anhydrous material.

After cooling, the sheets were assembled and their respective heat convertible layers were bonded together on either side of a membrane of polyvinyl butyral, using a method similar to that described in example 1, except that the maximum bonding temperature was maintained below 100° C.

This panel had extremely good fire resistance properties.

As a variation, a similar panel was made in which the heat convertible layers of hydrated sodium phosphate were replaced by layers of hydrated potassium phosphate each 2 mm thick. This panel also had good fire resistance properties.

EXAMPLE 12

Modified glazing panels were made corresponding to those described in examples 3, 4 and 7 to 10, except that in these modifications no protective strata were present. The results obtained from the point of view of fire resistance were substantially identical to similar panels which did include protective strata as described.

The cost of manufacture of these modified panels is somewhat less than that of otherwise similar panels incorporating protective strata, but it will be appreciated that these modified panels tend to undergo a deterioration in their optical properties and, in particular, in their transparencies during the course of time as a result of interaction between the barrier forming material and the vitreous sheets of the panels. This interaction is greatly inhibited and, in some cases, substantially eliminated by the presence of the protective strata.

The use of heat convertible layers of aluminum phosphate is particularly advantageous in the absence of a protective strata, since, when converted by heat, this material bonds itself very strongly to a vitreous sheet to which it is applied. This enables the panel to maintain its efficiency, even if a vitreous sheet of the panel should be broken (as by thermal shock) since the broken fragments can be retained in position by their adherence to the converted layer.

EXAMPLE 13

Figure 5:
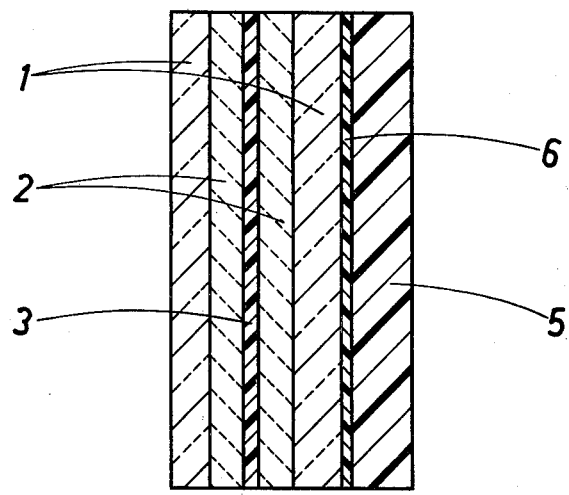

An opaque fire screening glazing panel, such a is schematically shown in FIG. 5, was made comprising a panel identical in all respects with the glazing panel described in example 1 which was bonded to a 6 mm thick sheet 5 of polyurethane via an intervening layer 6 of polyvinyl butyral 0.76 mm in thickness. The fire resistance properties of this composite panel were generally similar to those set forth in example 1.

Although the invention has been herein shown and described in what is conceived to be the most practical and preferred embodiments, it is recognized that departures may be therefrom within the scope of the invention which is not to be limited to details disclosed but is to be accorded the full scope of the claims so as to embrace any and all equivalent structures and methods.

What we claim is:

1. A fire screening glazing panel comprising
a first structural ply formed by a vitreous sheet,
a second structural ply formed by a vitreous or plastic sheet,
means for distributing heat uniformly from said first structural ply to said second structural ply upon one of said plies being subjected to heat, said means comprising a plastic membrane selected from the group consisting of polyvinylbutyral and polyurethane, and
a layer on each side of said plastic membrane, each layer comprising a material which is convertible to form a thermally insulating barrier of porous or cellular structure when said panel is subjected to sufficient heat, such as when said panel is subjected to a fire or the like, said heat-convertible barrier forming material being an hydrated metal salt selected from the group consisting of aluminates, plumbates, stannates, alums, borates, alkali metal silicates and phosphates, said plastic membrane with a layer of heat-convertible material on each side thereof being sandwiched between said first and second plies and each of said layers of barrier forming material being between 0.1 and 8 mm. thick.

2. A panel as recited in claim 1 wherein said panel is light-transmitting.

3. A panel as recited in claim 2 wherein said panel comprises two structural plies, each ply providing an external face of said panel.

4. A panel as recited in claim 2 wherein said panel is a laminate whose plies are bonded together in face-to-face relationship.

5. A panel as recited in claim 1 wherein at least one of said barrier forming layers is between 0.1 and 0.5 mm thick.

6. A panel as recited in claim 1 wherein said plastic membrane comprises polyvinyl butyral.

7. A panel as recited in claim 1 wherein at least one vitreous structural ply of said panel has been tempered.

8. A panel as recited in claim 7 wherein said tempered ply has been chemically tempered.

9. A panel as recited in claim 1 wherein said panel comprises two structural plies, each ply providing an external face of said panel, 10. A panel as recited in claim 1 wherein said panel is a laminate whose plies are bonded together in face-to-face relationship.

11. A panel as recited in claim 2 further comprising a protective stratum between said first structural ply and said barrier forming material for inhibiting interaction between said barrier forming material and said first ply, said protective stratum selected from the group consisting of layers of polyvinyl butyrl substantially water impervious plastic sheet, and polyurethane substantially water impervious plastic sheets and coatings of anhydrous metal oxides and anhydrous aluminum phosphate.

12. A panel as recited in claim 11 wherein said protective stratum comprises a protective coating of an anhydrous metal compound deposited onto said vitreous sheet face.

13. A panel as recited in claim 12 wherein said barrier forming material is selected from the group consisting of alums, borates, and alkali metal silicates, and wherein said protective stratum is selected from the group consisting of zirconium oxide and anhydrous aluminum phosphate.

14. A panel as recited in claim 12 wherein said barrier forming material comprises hydrated aluminum phosphate, and wherein said protective stratum is selected from the group consisting of titanium oxide, zirconium oxide, tin oxide, and anhydrous aluminum phosphate.

15. A panel as recited in claim 1 further comprising a protective stratum between said first structural ply and said barrier forming material for inhibiting interaction between said barrier forming material and said first ply, said protective stratum selected from the group consisting of layers of polyvinylbutyral substantially water impervious plastic sheet, and polyurethane substantially water impervious plastic sheet and coatings of anhydrous metal oxides and anhydrous aluminum phosphate.

16. A panel as recited in claim 15 wherein said barrier forming material is selected from the group consisting of alums, borates, and alkali metal silicates, and wherein said protective stratum is selected from the group consisting of coatings of zirconium oxide and anhydrous aluminum phosphate.

17. A panel as recited in claim 15 wherein said barrier forming material comprises hydrated aluminum phosphate, and wherein said protective stratum is selected from the group consisting of coating of titanium oxide, zirconium oxide, tin oxide, and anhydrous aluminum phosphate.

18. A panel as recited in claim 15 wherein said protective stratum comprises a protective coating of an anhydrous metal compound selected from the group consisting of anhydrous metal oxides and anhydrous aluminum phosphate deposited onto said vitreous sheet face.

19. A panel as recited in claim 18 wherein said coating is between 100 and 1000 Angstrom units thick.

20. A panel as recited in claim 15 wherein a protective stratum is provided between said vitreous structural ply of said panel and an adjacent layer of barrier forming material.

21. A panel as recited in claim 15 wherein said protective stratum comprises a layer comprising a sheet of substantially water impervious plastic selected from the group consisting of polyvinylbutyral and polyurethane.

22. A panel as recited in claim 21 wherein said protective stratum comprises polyurethane.

* * * * *